L. V. COCKRUM.
POULTRY FEEDER.
APPLICATION FILED OCT. 12, 1910.
996,214.
Patented June 27, 1911.
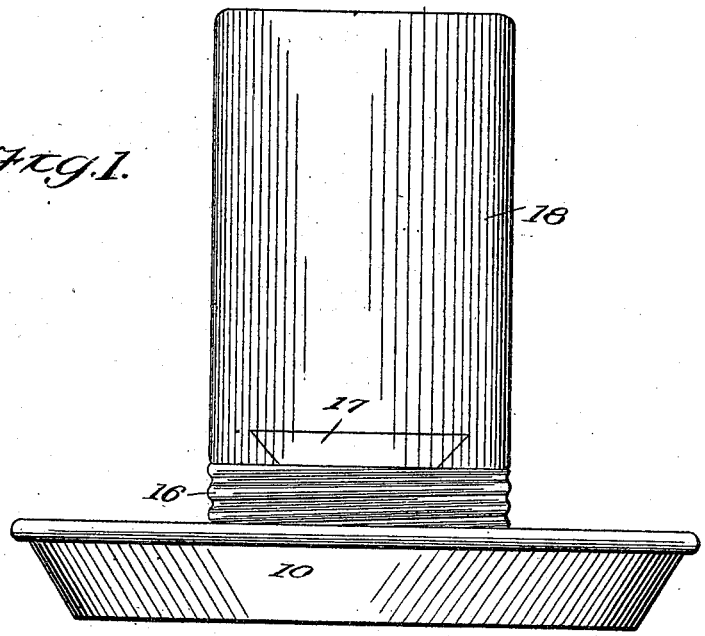
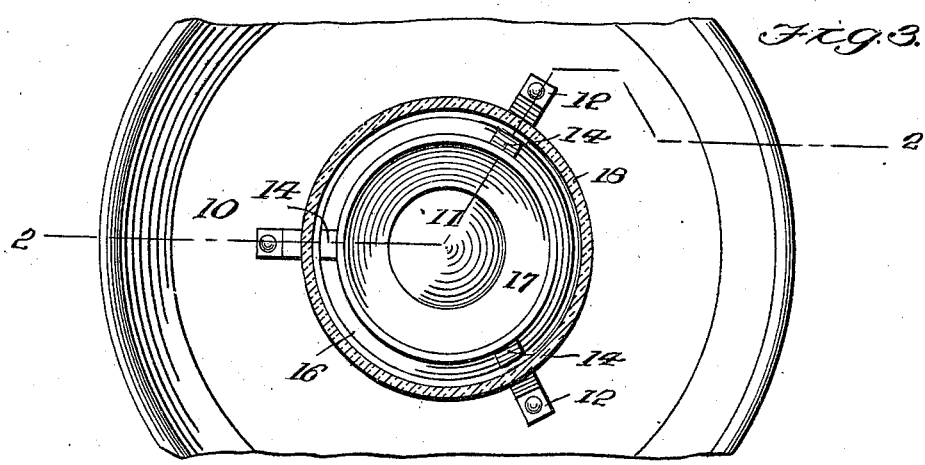
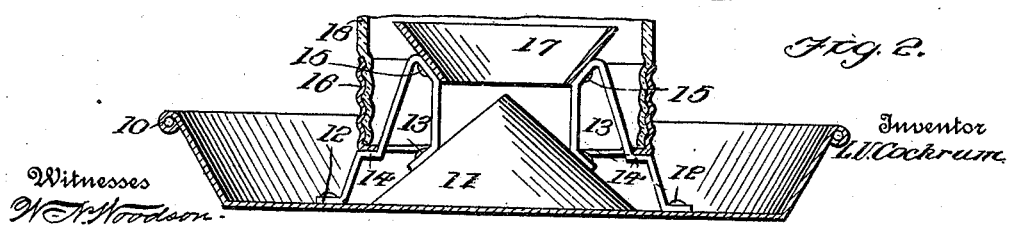

UNITED STATES PATENT OFFICE.

LEELAND V. COCKRUM, OF KIRKSVILLE, MISSOURI.

POULTRY-FEEDER.

996,214.

Specification of Letters Patent. Patented June 27, 1911.

Application filed October 12, 1910. Serial No. 586,654.

*To all whom it may concern:*

Be it known that I, LEELAND V. COCKRUM, citizen of the United States, residing at Kirksville, in the county of Adair and State of Missouri, have invented certain new and useful Improvements in Poultry-Feeders, of which the following is a specification.

This invention relates to improvements in devices for feeding poultry, and has for one of its objects to provide a simply constructed device of this character whereby dry feed may be supplied to the poultry in restricted quantities, and just so fast as required and without wasting the feed or exposing it to the elements.

Another object of the invention is to provide a device of this character wherein means are provided whereby the feed if it becomes clogged is released by the action of the poultry in their efforts to secure the feed.

With these and other objects in view, the invention consists of certain novel features of construction as hereinafter shown and described and then specifically pointed out in the claims; and, in the drawing illustrative of the preferred embodiment of the invention, Figure 1 is a side elevation of the improved device. Fig. 2 is a vertical central section taken on the line 2—2 of Fig. 3; and, Fig. 3 is a plan view of the feeder, showing the receptacle in section.

The improved device comprises a base member 10 in the form of a shallow pan open at the upper side. Mounted upon the pan centrally thereof is a cone 11. Also mounted upon the bottom of the pan 10 are a plurality of standards, each preferably formed of a single strip of metal and connected at one end at 12 to the bottom of the pan and connected at the other end at 13 to the cone. Each standard is also provided with an outer bearing 14 and an inner bearing 15, the outer bearings being located at some distance from the cone 11, while the inner bearings 15 are located near the center of the pan and some distance above the cone.

Mounted upon the lower and outer bearings 14 is an annular member 16, preferably formed of sheet metal and threaded as shown, the threads being formed by spinning or pressing the material in the well known manner. The lower end of the annular member 16 is spaced slightly above the bottom of the pan 10 and likewise above the lower edge of the cone and substantially in vertical alinement above the same, thus leaving a relatively contracted annular space between the cone and the annular member. Bearing upon the upper bearings 15 is another annular member 17 having its upper face concave as shown. The member 17 is preferably formed in truncated cone shape, and is located above the center of the cone 11 leaving a contracted annular space between the cone and the concave annular member and serves as a retarder to control the flow of the material, and prevent it from "flooding" the larger cone 11.

The receiver for the material is represented as a whole at 18 and is externally threaded at its open end to engage the threads of the member 16. The members 16 and 18 may be constructed of any suitable material, but in practice an ordinary Mason fruit jar is employed for the member 18 and the cover for the fruit jar utilized to form the member 16, the top of the cover being cut out to form the discharge of the receptacle. By constructing the receptacle of glass the contents may be observed at all times, so that the attendant may know the condition of the material and also how much remains in the receptacle, so that the receptacle may be replenished when required. The material employed in the receptacle 18 is the usual feed supplied to poultry and especially young chicks, and consists of pounded corn or other grains.

By this arrangement it will be obvious that the grain is fed uniformly to the space between the members 11 and 16 and only a limited quantity surely will run out in the pan, or just sufficient to supply the poultry, and as fast as the feed is eaten a fresh supply runs down and takes its place, thus the supply of feed is uniform and is fed into the pan only just so fast as the poultry desires it. The bottom of the cone 11 being located in substantially vertical alinement below the lower edge of the annular member 16, in event of the caking or clogging of the material a sufficient quantity is exposed within reach of the poultry to enable them to pick the caked material loose, and thus produces a self clearing device.

The improved device will be found especially advantageous in damp weather, as by the peculiar arrangement of the parts the dampness will not deteriorate the material, and in event of the clogging or caking of the material, as before stated, the efforts of the poultry to reach the material will cause the disintegration of the same and thus break the clogged material up into small particles and permit it to again flow from the device.

The improved device is simple in construction, is constructed wholly of metal and glass, and the parts are readily separable for cleansing and fumigation.

It will be noted that the member 17 is less in diameter than the interior of the receptacle 18 and is located with its lower edge slightly above the apex of the cone 11. By this means when thus arranged the member 17 it will be noted serves as a retarder to check the downward flow of the material and prevent it from "flooding" the pan, but will flow only so fast as the lower portion of the material is removed in the act of feeding. This is an important feature of applicant's device and adds materially to its utility and effectiveness.

Having thus described my invention, what is claimed as new is:

1. A poultry feeder including a shallow pan, a cone arranged centrally within the pan, a plurality of standards disposed in spaced circular relation about the cone and having their upper ends turned in and down to seat against the side of the cone, said standards having bearing faces at their lower and upper ends, an annular supporting member carried upon the lower bearings and having threads in its walls, a receptacle closed at its upper end engaging in threaded relation in the annular supporting member, and a convexed annular member carried upon the upper bearing faces within the receptacle and having its upper edge spaced inwardly from the sides of the receptacle and its lower end opening over the same.

2. A poultry feeder including a pan, a cone arranged in the pan, a supporting member carried by the pan and overhanging the cone, a receptacle closed at its upper end carried upon the supporting member over the cone, and a retarder carried by the pan over the cone and within the receptacle providing passage ways at the walls of the receptacle and over the apex of the cone.

3. A poultry feeder including a relatively shallow pan, a receptacle supported in spaced relation over the central portion of the pan, a cone carried in the central portion of the pan beneath the receptacle, and a retarder carried by the pan within the receptacle and overhanging the cone, the retarder being in the form of a convexed annular ring providing concentric passages in the receptacle above the cone.

4. A poultry feeder including a pan, a cone disposed upon the pan, a receptacle carried by the pan concentric over the cone and adapted to contain a quantity of grain and a feeder carried within the receptacle over the cone to feed the grain in two paths upon the cone, one of the paths directing the grain about the perimeter of the base of the cone, and the other one of the paths directing the grain upon the apex of the cone whereby the grain falls at an angle against the grain in the first path to force the same out into the pan.

5. A poultry feeder including a pan, a cone disposed within the pan, a receptacle carried by the pan over the cone, a feeding ring arranged within the receptacle to direct the contents thereof in two separate concentric paths upon the cone, the contents of the receptacle of the inner path being adapted to strike the contents in the outer path at an angle at the base of the cone whereby the same is forced beneath the receptacle into the pan.

In testimony whereof, I affix my signature in presence of two witnesses.

LEELAND V. COCKRUM. [L. S.]

Witnesses:
CHAS. U. MILLER,
SAM STEWART.

---

Copies of this patent may be obtained for five cents each, by addressing the "Commissioner of Patents, Washington, D. C."